(12) United States Patent
Ueda et al.

(10) Patent No.: US 10,778,350 B2
(45) Date of Patent: Sep. 15, 2020

(54) FADER DEVICE (71) Applicant: YAMAHA CORPORATION, Hamamatsu-shi (JP)

(72) Inventors: Taku Ueda, Hamamatsu (JP); Hisashi Nagai, Hamamatsu (JP); Hisanobu Suzuki, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 16/547,941

(22) Filed: Aug. 22, 2019

(65) Prior Publication Data
US 2020/0067619 A1 Feb. 27, 2020

(30) Foreign Application Priority Data

Aug. 23, 2018 (JP) .................. 2018-155949

(51) Int. Cl.
H04H 60/04 (2008.01)
H04B 1/00 (2006.01)
H01C 10/14 (2006.01)

(52) U.S. Cl.
CPC ............. *H04H 60/04* (2013.01); *H04B 1/00* (2013.01); *H01C 10/14* (2013.01); *H04R 2430/01* (2013.01)

(58) Field of Classification Search
CPC ..... H04R 2430/01; H01C 10/14; H04H 60/04
See application file for complete search history.

(56) References Cited

U.S. PATENT DOCUMENTS

| 6,813,361 | B1 * | 11/2004 | Jeffs ....................... H04H 60/04 369/4 |
| 2002/0031237 | A1 * | 3/2002 | Kuykendall ......... H04B 10/801 381/119 |
| 2018/0216710 | A1 * | 8/2018 | Takagi ................... H04H 60/04 |
| 2019/0296843 | A1 * | 9/2019 | Jeffs ....................... H04H 60/04 |

FOREIGN PATENT DOCUMENTS

JP 2009135426 A 6/2009

* cited by examiner

*Primary Examiner* — Andrew L Sniezek
(74) *Attorney, Agent, or Firm* — Rossi, Kimms & McDowell LLP (57) ABSTRACT

A fader device according to an aspect of the present invention includes: a guide rail that extends linearly and a slider that slidably engages with the guide rail, in which the slider includes a pressure-contact member that is to be in pressure contact with the guide rail, and a compression coil spring for jutting the pressure-contact member toward the guide rail.

7 Claims, 8 Drawing Sheets

FADER DEVICE

BACKGROUND OF THE INVENTION

Field of the Invention

The present invention relates to a fader device.

Discussion of the Background

Apparatuses that combine a plurality of sound signals at an arbitrary ratio e.g., audio mixers such as a PA (public address) mixer and a DJ (disc jockey) mixer, each provided with a fader device for setting parameters for defining signal strength, etc. in a stepless manner, are widely used.

The fader devices allow setting of the parameters through either turning of an operation dial or linear movement of an operation knob. Of these, a fader device with an operation knob to be linearly moved is employed in many apparatuses, since such a fader device facilitates fine control owing to a larger stroke.

Such a fader device is designed in such a way that an appropriate resistance acts against a movement of the operation knob due to a friction force, in order that parameters being set are retained and a user can change the parameters as desired relying on a travel distance of the operation knob.

In many cases, the conventional fader device is provided with a guide rail that extends linearly and a slider that slidably engages with the guide rail, and configured such that the slider brings a friction-generating member into a pressure contact with the guide rail by means of a leaf spring, in order to generate a friction force between the guide rail and the slider.

For example, Japanese Unexamined Patent Application, Publication No. 2009-135426 proposes, as a device for adjusting an applied force (friction force) of a fader device, an applied force adjusting device provided with a slide member with a lever member for operation, and a shaft member (guide rail) to which the slide member is slidably attached. The slide member is provided with: a friction plate in pressure contact with the shaft member; a leaf spring that brings the friction plate into pressure contact with the slide member; and a cam that adjusts the pressure-contact force of the friction plate with respect to the shaft member, exerted by the leaf spring.

PRIOR ART DOCUMENTS

Patent Documents

Patent Document 1: Japanese Unexamined Patent Application, Publication No. 2009-135426

SUMMARY OF THE INVENTION

Problems to be Solved by the Invention

In an apparatus that generates a friction force by means of a leaf spring, such as the applied force adjusting device disclosed in the aforementioned publication, the friction force may vary due to a manufacturing error, time-dependent alteration, etc., since a slight change in a deformation amount of the leaf spring leads to a great change in a pressing force. In order to enable correction of such a variation in the friction force, an adjustable width of a cam must be great; however, a greater adjustable width leads to a smaller appropriate angular range of a cam, and eventually an adjustment of the cam may be difficult.

In view of the aforementioned disadvantages, an object of the present invention is to provide a fader device that provides a stable and easily adjustable frictional force.

Means for Solving the Problems

A fader device according to an aspect of the present invention made for solving the aforementioned problems includes: a guide rail that extends linearly and a slider that slidably engages with the guide rail, in which the slider includes: a pressure-contact member that is to be in pressure contact with the guide rail or a friction target member extending in parallel to the guide rail; and a compression coil spring for jutting the pressure-contact member toward the guide rail or the friction target member.

DESCRIPTION OF THE EMBODIMENTS

A fader device according to an aspect of the present invention includes: a guide rail that extends linearly and a slider that slidably engages with the guide rail, in which the slider includes: a pressure-contact member that is to be in pressure contact with the guide rail or a friction target member extending in parallel to the guide rail; and a compression coil spring for jutting the pressure-contact member toward the guide rail or the friction target member.

Due to employing the compression coil spring, which is an elastic member exhibiting little variation in elastic force resulting from individual variability and wear with time, the fader device provides a stable friction force. In addition, since a change in elastic force in response to a change in compression amount of the compression coil spring is relatively small, the fader device can be easily adjusted to give a desired friction force.

Embodiments of the present invention will be described in detail hereinafter, with appropriate reference to the drawings.

First Embodiment

Figure 1:
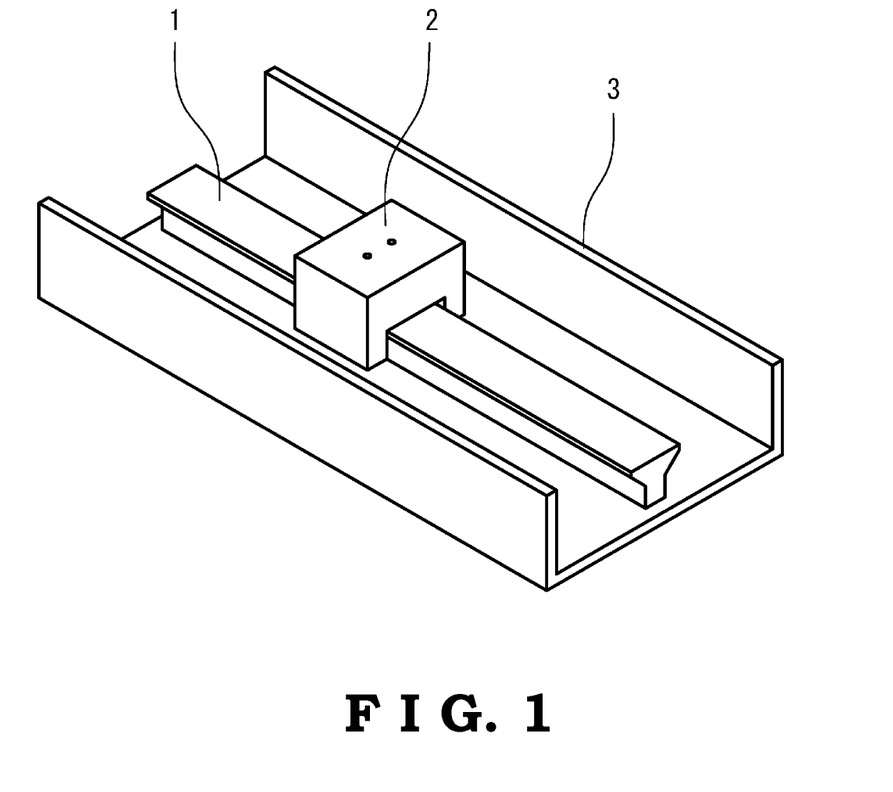
FIG. 1 is a schematic perspective view of a fader device according to one embodiment of the present invention.
Figure 2:
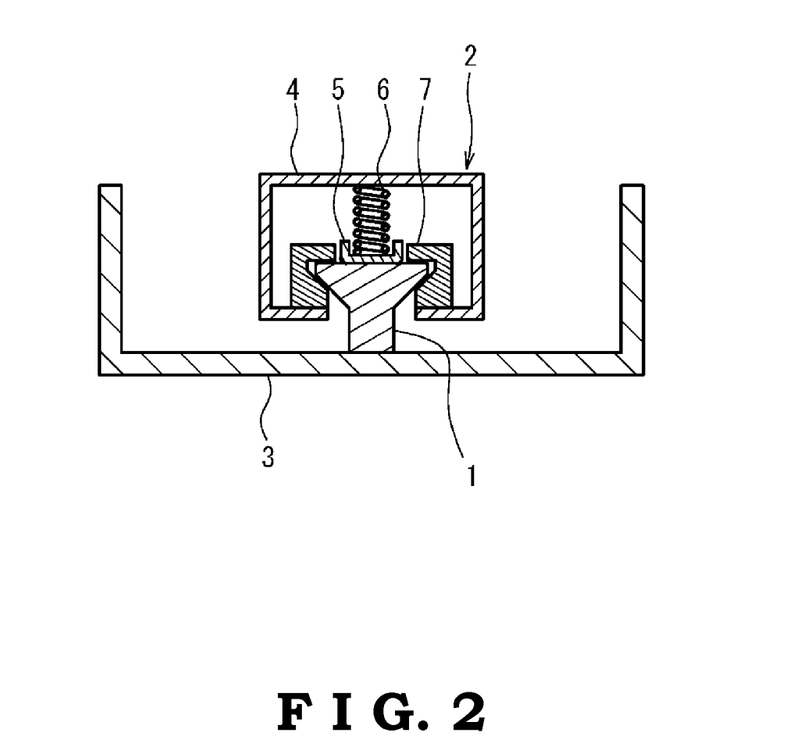
FIG. 2 is a schematic cross sectional view of the fader device illustrated in FIG. 1.

FIGS. 1 and 2 illustrate a fader device according to a first embodiment of the present invention. The fader device includes a guide rail 1 that extends linearly and a slider 2 that slidably engages with the guide rail 1.

Guide Rail

The guide rail 1 is attached to a housing 3. In the present embodiment, the guide rail 1 is configured to have a specifically-shaped cross section so that a single rail can fix a posture of the slider 2, i.e., can prevent the slider 2 from rotating about the guide rail 1.

A material for the guide rail 1 is preferably superior in rigidity and abrasion resistance, and examples thereof include steel, stainless steel, carbon, a hard resin, a composite material thereof, and the like. Of these, stainless steel is particularly preferably used.

The guide rail 1 may be formed integrally with an entirety or a part of the housing 3. As a specific example, the guide rail 1 and at least a part of the housing 3 may be formed integrally by folding a metal plate.

Slider

The slider 2 includes: a main body 4 slidably engaging with the guide rail 1; a pressure-contact member 5 to be in pressure contact with the guide rail 1; and a compression coil spring 6 for jutting the pressure-contact member 5 toward the guide rail 1.

Main Body

The main body 4 includes an engagement portion 7 engaging with the guide rail 1, and holds the pressure-contact member 5 and the compression coil spring 6. The main body 4 may be configured to have a box-like shape, with one side being open to form the engagement portion 7 that receives the guide rail 1.

The engagement portion 7 may either have a bushing or a bearing that engages with the guide rail 1, or be configured to be in direct contact with the guide rail 1 depending on the material, etc. of the main body 4.

Pressure-Contact Member

The pressure-contact member 5 is pressed against the guide rail 1 by means of the compression coil spring 6, to generate a friction force with respect to the guide rail 1.

A shape of the pressure-contact member 5 is not particularly limited, and may have a planar contact surface to be in line contact or planar contact with the guide rail 1, or a recessed contact surface to be in contact with the guide rail 1 at two sites at an interval in a sliding direction, so as to stabilize the friction force.

The pressure-contact member 5 is preferably retained on the main body 4 in such a way that the pressure-contact member 5 can move only in a direction perpendicular to the guide rail 1 on the main body 4, i.e., not to move in a direction along the guide rail 1 on the main body 4. Due to thus retaining the pressure-contact member 5 on the main body 4, a constant friction force is generated between the pressure-contact member 5 and the guide rail 1, whereby operability of the fader device is enabled to be improved.

A material of the pressure-contact member 5 is not particularly limited, and in light of stability of a contact state, is preferably a resin such as an ABS resin, polyacetal, etc. that is relatively high in modulus of elasticity and superior in abrasion resistance. The material for forming the pressure-contact member 5 may contain, for example, a filler for improving abrasion resistance, and the like.

Compression Coil Spring

The compression coil spring 6 presses the pressure-contact member 5 against the guide rail 1 to generate a friction force between the pressure-contact member 5 and the guide rail 1. In other words, the compression coil spring 6 generates a friction force by permitting a normal reaction to act between the pressure-contact member 5 and the guide rail 1. Therefore, the elastic force of the compression coil spring 6 is selected such that the appropriate friction force is generated between the pressure-contact member 5 and the guide rail 1.

The lower limit of the force with which the compression coil spring 6 presses the pressure-contact member 5 against the guide rail 1 is preferably 0.1 N. Meanwhile, the upper limit of the force with which the compression coil spring 6 presses the pressure-contact member 5 against the guide rail 1 is preferably 0.4 N. When the force with which the compression coil spring 6 presses the pressure-contact member 5 against the guide rail 1 is less than the lower limit, sufficient sliding resistance may not be applied to the slider 2, and consequently a user may not be readily adjust an amount of operation of the fader device. To the contrary, when the force with which the compression coil spring 6 presses the pressure-contact member 5 against the guide rail 1 is greater than the upper limit, the sliding resistance applied to the slider 2 may be undue, and consequently the user may not be readily adjust the amount of operation of the fader device.

The lower limit of the length of the compression coil spring 6 in a state in which the pressure-contact member 5 is in contact with the guide rail 1 is preferably 50% of the free length. Meanwhile, the upper limit of the length of the compression coil spring 6 in a state in which the pressure-contact member 5 is in contact with the guide rail 1 is preferably 90% of the free length. When the length of the compression coil spring 6 in a state in which the pressure-contact member 5 is in contact with the guide rail 1 is less than the lower limit, assembly of the fader device, i.e., a procedure of mounting the compressed compression coil spring 6 into the slider 2, may be less simple. To the contrary, when the length of the compression coil spring 6 in a state in which the pressure-contact member 5 is in contact with the guide rail 1 is greater than the upper limit, a change in elastic force in response to a change in the length of the compression coil spring 6 may be so great that adjustment of the friction force between the pressure-contact member 5 and the guide rail 1 may not be easy.

The fader device is mounted in an apparatus such as a PA mixer in such a way that a position of the slider 2 can be detected. Examples of a procedure of detecting the position of the slider 2 include: a procedure of arranging a strip-shaped resistor in parallel to the guide rail 1 and making the slider 2 hold a terminal to be in slidable contact with the resistor, whereby an electric resistance between the terminal and an end of the resistor is detected; a procedure of using a contactless distance sensor such as an ultrasonic sensor, a procedure of measuring a travel distance of the slider 2 or a member attached to the slider 2 by an encoder; and the like.

Advantages

Due to employing the compression coil spring 6, which exhibits little variation in elastic force resulting from individual variability and wear with time, the fader device of the present embodiment provides a stable friction force.

The fader device of the present embodiment enables adjustment of the force with which the compression coil spring 6 presses the pressure-contact member 5 against the guide rail 1, owing to a shim or the like interposed between the main body 4 and the compression coil spring 6. Since a change in elastic force in response to a change in compression amount of the compression coil spring 6 is relatively small, the fader device can be easily adjusted to give a desired friction force (sliding resistance of the slider 2).

Second Embodiment

Figure 3:
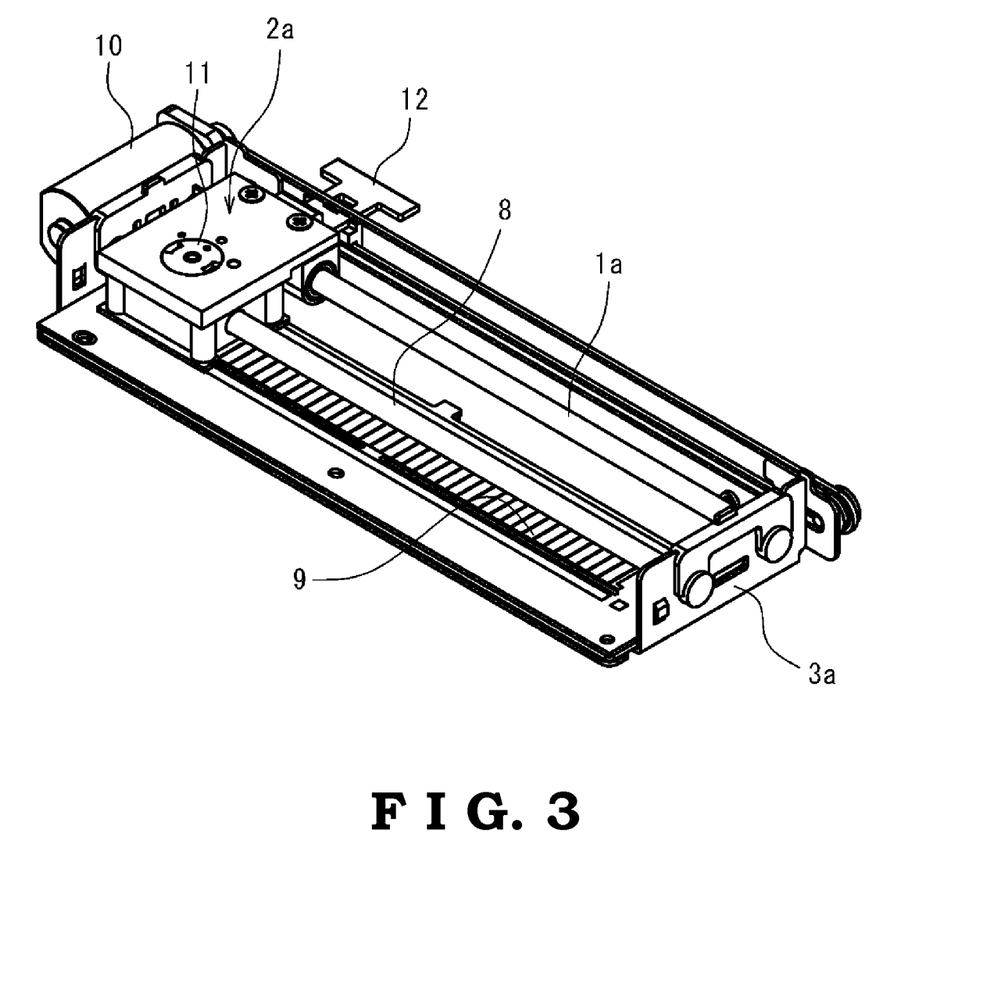
FIG. 3 is a schematic perspective view of a fader device according to another embodiment of the present invention different from that illustrated in FIG. 1.
Figure 4:
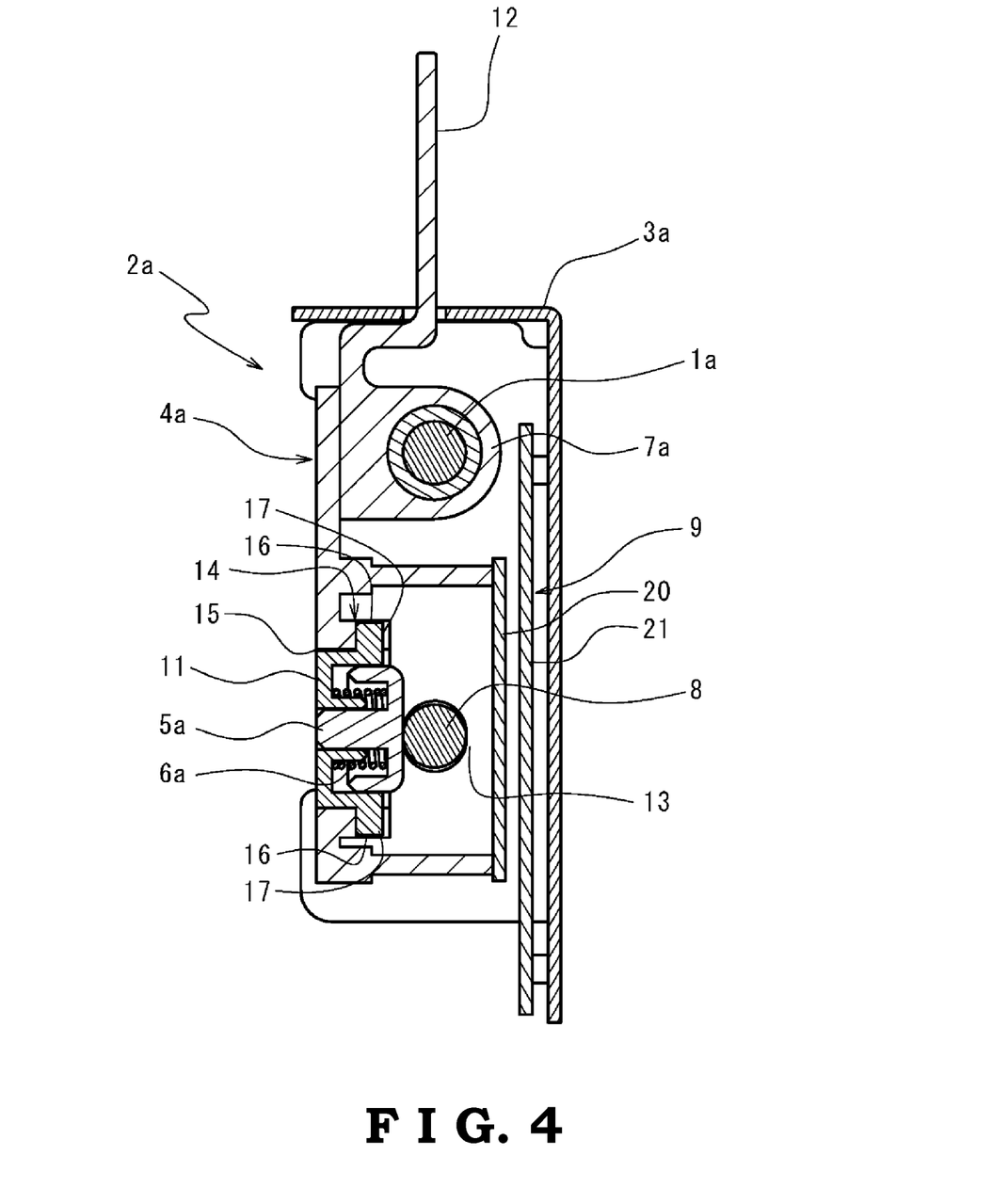
FIG. 4 is a schematic cross sectional view of the fader device illustrated in FIG. 3.

FIGS. 3 and 4 illustrate a fader device according to a second embodiment of the present invention. The fader device includes: a guide rail 1a that extends linearly; a friction target member 8 extending in parallel to the guide rail 1a; a slider 2a that slidably engages with the guide rail 1a; a detection mechanism 9 that detects a position of the slider 2a; and a driving mechanism 10 that electrically moves the slider 2a along the guide rail 1a.

Constitutive elements of the fader device according to the present embodiment corresponding to the constitutive elements of the fader device illustrated in FIG. 1 are referred to by the same reference numerals with "a" appended, in order to show the correspondence. The constitutive elements not particularly described of the fader device according to the present embodiment may be similar to those of the fader device illustrated in FIG. 1.

Guide Rail

The guide rail 1a is attached to a housing 3a. In the present embodiment, the guide rail 1a is a circular cylindrical shaft. The slider 2a slidably engages not only with the guide rail 1a, but also with a friction target member 8, whereby a posture thereof is fixed.

Friction Target Member

The friction target member 8 may be formed from a shaft similar to that of the guide rail 1a. In addition, the friction target member 8 is attached to the housing 3a in a similar manner to the guide rail 1a, and retained in parallel to the guide rail 1a.

Slider

Figure 5:
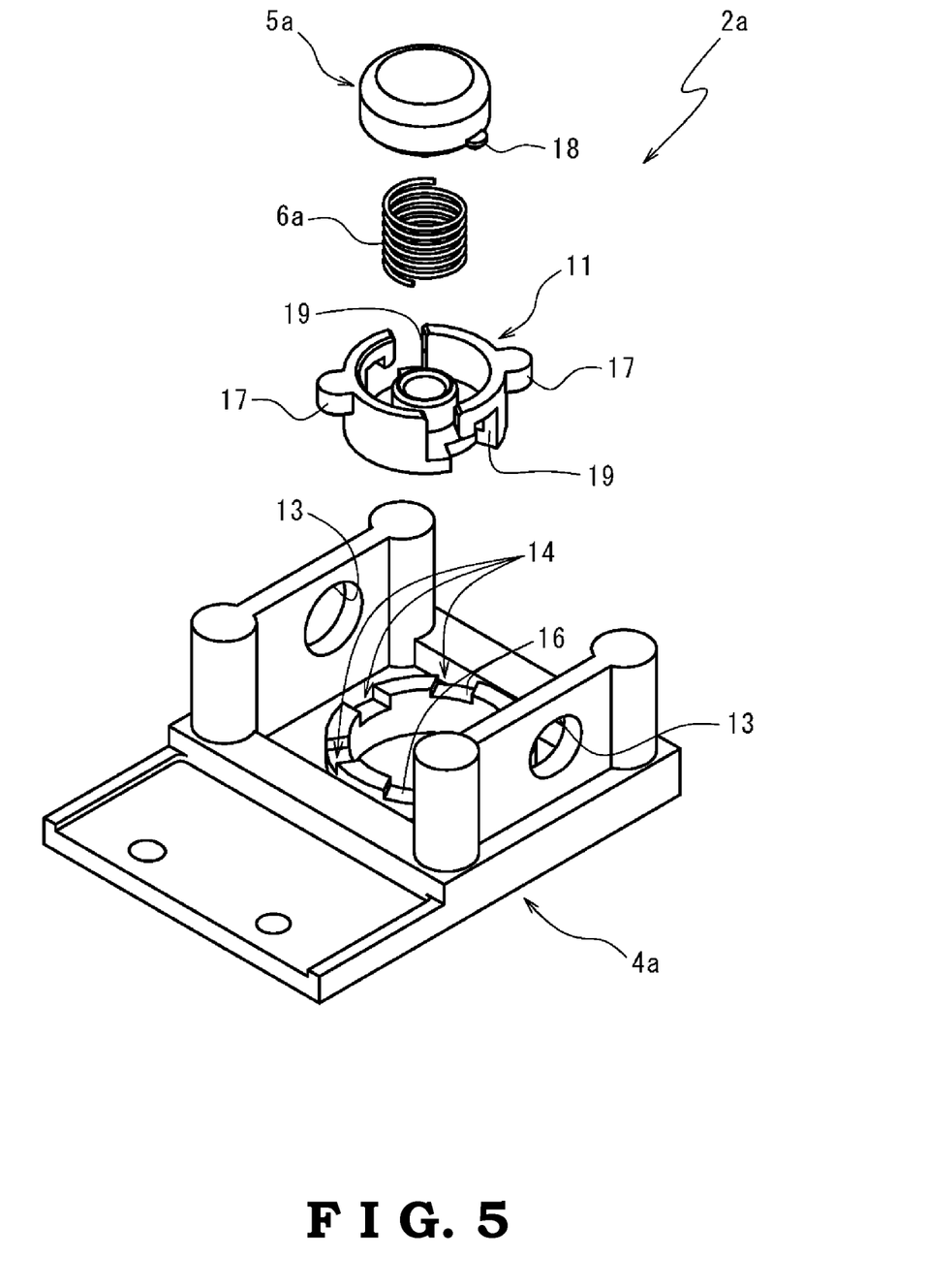
FIG. 5 is an upside-down exploded perspective view of a part of a slider of the fader device illustrated in FIG. 3.

As further illustrated in FIG. 5, the slider 2a includes: a main body 4a slidably engaging with the guide rail 1a; a pressure-contact member 5a to be in pressure contact with the friction target member 8; a compression coil spring 6a for jutting the pressure-contact member 5a toward the friction target member 8; and a holding member 11 that holds the pressure-contact member 5a and the compression coil spring 6a.

Main Body

The main body 4a of the slider 2a includes: an engaging portion 7a that engages with the guide rail 1a; an operation lever portion 12 that projects to the outside of the housing 3a and to which a knob (not illustrated) is attached; a friction-contact portion 13 that is in contact with the friction target member 8 on an opposite side of the pressure-contact member 5a being in pressure contact; a plurality of positioning portions 14 that are capable of retaining the holding member 11 respectively at different positions in a stretch direction of the compression coil spring 6a; and a through hole 15 that enables the holding member 11 to be pushed from an opposite side of the friction target member 8 toward the friction target member 8.

The engaging portion 7a may be configured to have a cylindrical bushing that slidably engages with the guide rail 1a.

The operation lever portion 12 is preferably formed integrally with a portion of the main body 4a retaining the engaging portion 7a, so as to project from the portion retaining the engaging portion 7a to an opposite side of the friction target member 8, whereby a user's operation can be linearly converted to a travel distance of the slider 2a.

The friction-contact portion 13 is in slidable contact with the friction target member 8, on an opposite side of the pressure-contact member 5a being in pressure contact. In other words, due to the friction target member 8 being interposed between the friction-contact portion 13 and the pressure-contact member 5a, the posture of the slider 2a around the guide rail 1a is fixed.

The friction-contact portion 13 may be arranged either to face the pressure-contact member 5a, or at a position deviated from a position facing the pressure-contact member 5a. In the case in which the friction-contact portion 13 is arranged at a position deviated from a position facing the pressure-contact member 5a, the friction-contact portion 13 is preferably provided in front of and behind the pressure-contact member 5a in the sliding direction, such that an axial rotational force perpendicular to the pressure-contact direction and to the sliding direction, caused by a pressure-contact force of the pressure-contact member 5a with respect to the friction target member 8, is not applied to the slider 2a.

The friction-contact portion 13 may be a hole formed on each of walls provided in front of and behind the pressure-contact member 5a in the sliding direction, through which the friction target member 8 is inserted. Such a configuration enables the pressure-contact member 5a to be correctly pressed against the friction target member 8.

A material of the friction-contact portion 13 is preferably a resin such as an ABS resin, polyacetal, etc. that is relatively high in modulus of elasticity and superior in abrasion resistance.

The positioning portion 14 may be a set of a plurality of radially positioning grooves 16 that are provided around a central axis of the compression coil spring 6a and are open in a direction of protrusion of the pressure-contact member 5a jutted by the compression coil spring 6a.

The holding member 11 retained by the positioning portion 14 constituted of the positioning grooves 16 may be configured to have a plurality of positioning projections 17 that protrude radially outward and are received by the positioning grooves 16. The holding member 11 is pressed against a bottom end of the positioning groove 16 and eventually fixed with respect to the main body 4a, by a reaction force of the compression coil spring 6a jutting the pressure-contact member 5a.

Due to each being different in depth of the positioning groove 16, the plurality of positioning portions 14 retain the holding member 11 respectively at different positions in a stretch direction of the compression coil spring 6a. By selecting the positioning portions 14 for retaining the holding member 11, the length (amount of compression) of the compression coil spring 6a in a state in which the pressure-contact member 5a is in contact with the friction target member 8 can be adjusted, and in turn the pressure-contact force of the pressure-contact member 5a with respect to the friction target member 8, eventually the friction force between the pressure-contact member 5a and the friction target member 8 can be selected.

The plurality of sets of positioning grooves 16 each constituting the positioning portion 14 may be formed around the central axis of the compression coil spring 6a at angular intervals. Consequently, by attaching the holding member 11 to the main body 4a while selecting an angle thereof around the central axis of the compression coil spring 6a, the friction force between the pressure-contact member 5a and the friction target member 8 can be selected.

The through hole 15 on the main body 4a exposes the holding member 11 on the opposite side of the friction target member 8. As a result, the user can release the holding member 11 from the positioning portion 14 by pressing the holding member 11 toward the friction target member 8 so as to further compress the compression coil spring 6a, and then make another positioning portion 14 retain the holding member 11 by rotating the holding member 11 about the central axis of the compression coil spring 6a. In other words, by providing the through hole 15 on the main body 4a, relatively easy adjustment of the friction force between the pressure-contact member 5a and the friction target member 8 is enabled.

Pressure-Contact Member

The pressure-contact member 5a is held by the holding member 11 in a movable manner in a direction perpendicular to the friction target member 8. In addition, the pressure-contact member 5a is preferably held by the holding member 11 in such a way that movement thereof toward the friction target member 8 is restricted. As a result, the pressure-contact member 5a together with the compression coil spring 6a are enabled to be held by the holding member 11 without being attached to the main body 4a. By forming an integral unit of the pressure-contact member 5a, the compression coil spring 6a and the holding member 11 beforehand, easy assembly of the fader device is enabled.

In order that the holding member 11 holds the pressure-contact member 5a together with the compression coil spring 6a, the pressure-contact member 5a may be formed in a columnar shape or a bottomed cylindrical shape with a side to be in contact with the friction target member 8 being closed, and may be configured to have an engaging projection 18 to be held by the holding member 11.

Compression Coil Spring

As described above, the compression coil spring 6a is retained in a compressed state between the holding member 11 and the pressure-contact member 5a.

Holding Member

The holding member 11 holds the pressure-contact member 5a and the compression coil spring 6a. The holding member 11 is pressed against the main body 4a and fixed, by a reaction force generated when the pressure-contact member 5a is pressed against the friction target member 8 by the elastic force of the compression coil spring 6a.

The holding member 11 may be formed in a cylindrical shape such that the pressure-contact member 5a may be inserted thereinto and guided in a direction perpendicular to the friction target member 8.

As illustrated in FIG. 5, the holding member 11 can be configured to have an engaging groove 19 having a hooked shape with which the engaging projection 18 of the pressure-contact member 5a engages, in order to hold the pressure-contact member 5a and the compression coil spring 6a. The hooked engaging groove 19 has an opening on an end of the holding member 11 on the friction target member 8 side. The engaging groove 19 may be a hooked groove that extends from the opening along the central axis direction of the compression coil spring 6a, then along a circumferential direction of the holding member 11, then toward the friction target member 8 along the central axis direction of the compression coil spring 6a, and does not reach the end of the holding member 11.

Detection Mechanism

A detection mechanism 9 is not particularly limited as long as a position of the slider 2a can be detected, and may be a linear encoder such as a static encoder, a magnetic encoder, etc. Such a linear encoder may be provided with, for example: a mover 20 attached to the slider 2a and including an electrode, a magnetic pole, etc.; and a detection circuit substrate 21 attached to the housing 3a so as to face the mover 20, on which a detection pattern is periodically formed for detecting a change in an electric field, a magnetic field, etc. caused by the mover 20.

Driving Mechanism

A driving mechanism 10 is configured to move the slider 2a along the guide rail 1a by, for example, power of an electric motor or the like, via a timing belt etc. The driving mechanism 10 preferably does not generate great resistance when the user moves the slider 2a.

Advantages

The fader device of the present embodiment provides a stable friction force due to employing the compression coil spring 6a, and enables easy adjustment of the friction force during movement of the slider 2a, through selection of the positioning portion 14 on the main body 4a in which the positioning projections 17 of the holding member 11 are to be engaged with the positioning grooves 16.

Third Embodiment

Figure 6:
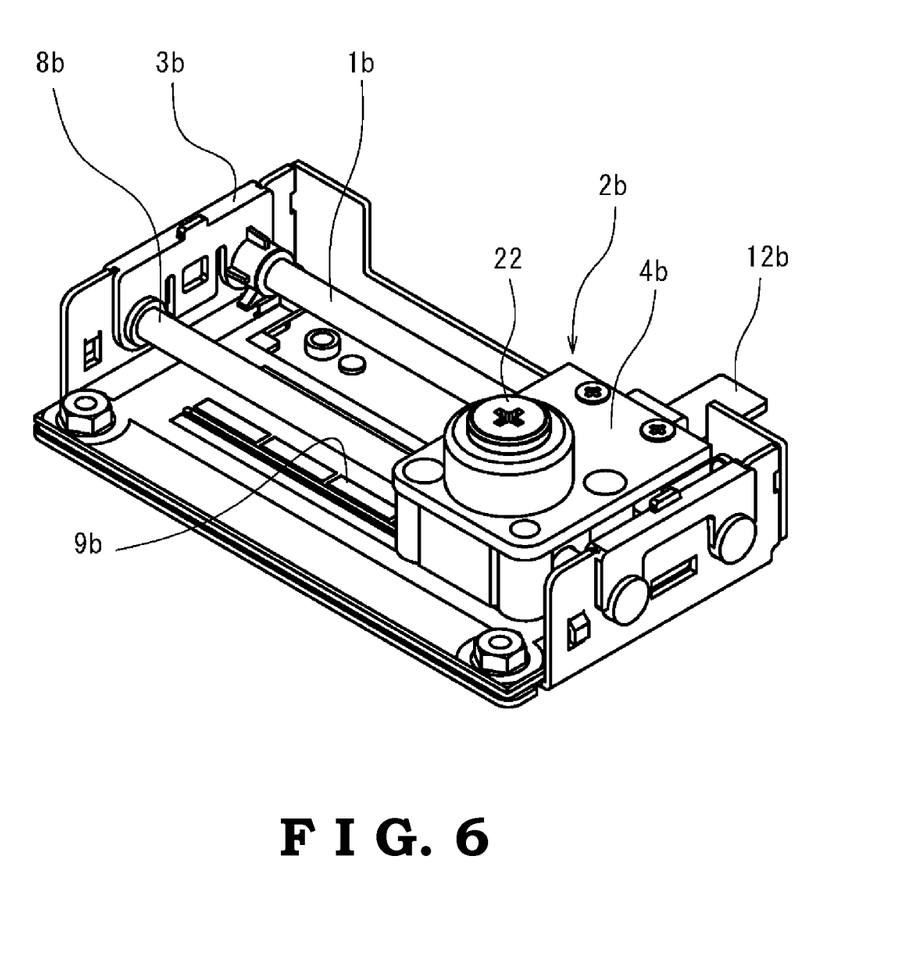
FIG. 6 is a schematic perspective view of a fader device according to still another embodiment different from those illustrated in FIGS. 1 and 3.
Figure 7:
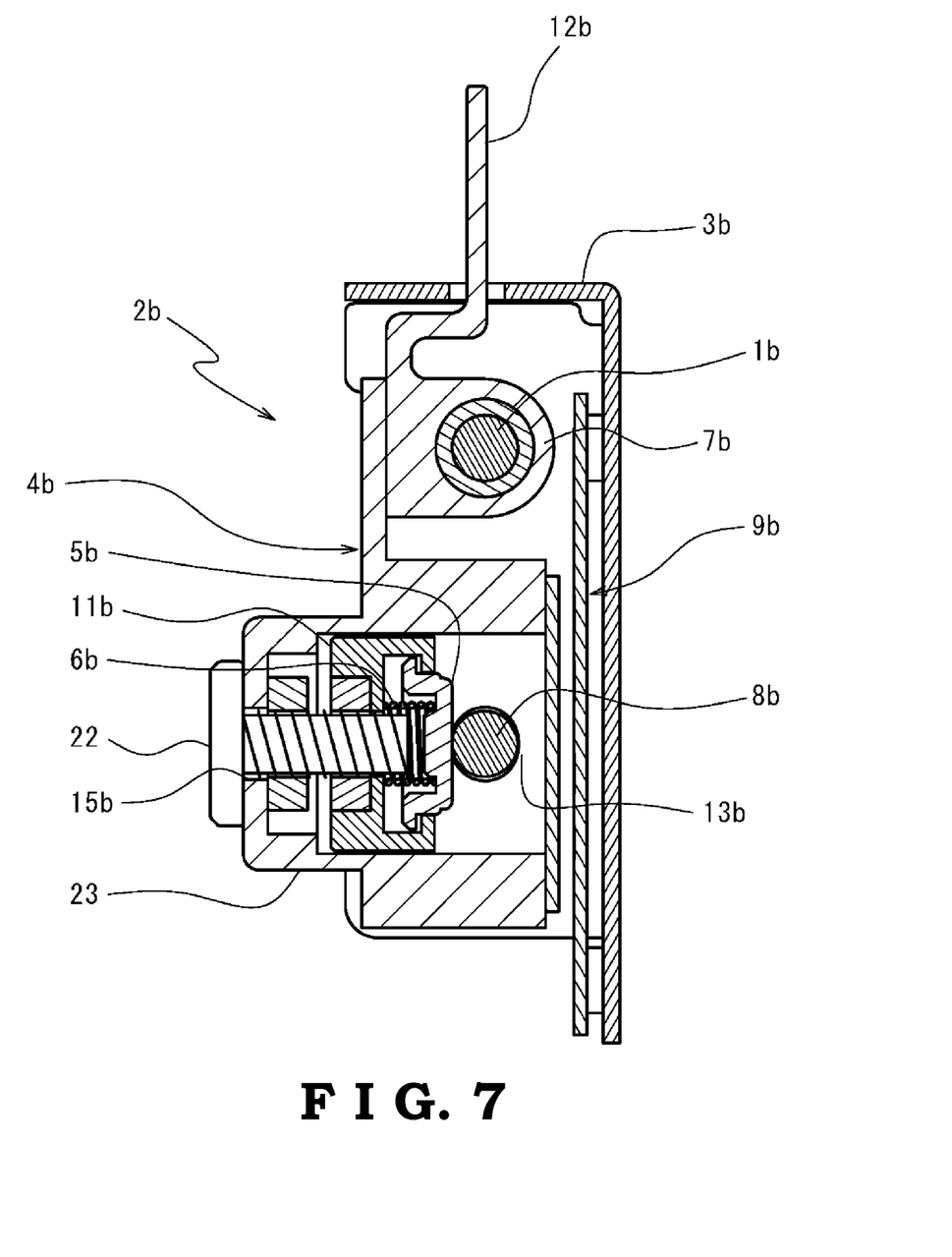
FIG. 7 is a schematic cross sectional view of the fader device illustrated in FIG. 6.

FIGS. 6 and 7 illustrate a fader device according to a third embodiment of the present invention. The fader device includes: a guide rail 1b that extends linearly; a friction target member 8b extending in parallel to the guide rail 1b; a slider 2b that slidably engages with the guide rail 1b; and a detection mechanism 9b that detects a position of the slider 2b.

Constitutive elements of the fader device according to the present embodiment corresponding to the constitutive elements of the fader device illustrated in FIG. 3 are referred to by the same reference numerals with "b" appended, in order to show the correspondence. The constitutive elements not particularly described of the fader device according to the present embodiment may be similar to those of the fader device illustrated in FIG. 3.

Guide Rail

The guide rail 1b is attached to a housing 3b. In the present embodiment, the guide rail 1b is a circular cylindrical shaft. The slider 2b slidably engages not only with the guide rail 1b, but also with a friction target member 8b, whereby a posture thereof is fixed.

Friction Target Member

The friction target member 8b may be formed from a shaft similar to that of the guide rail 1b. In addition, the friction target member 8b is attached to the housing 3b in a similar manner to the guide rail 1b, and retained in parallel to the guide rail 1b.

Slider

Figure 8:
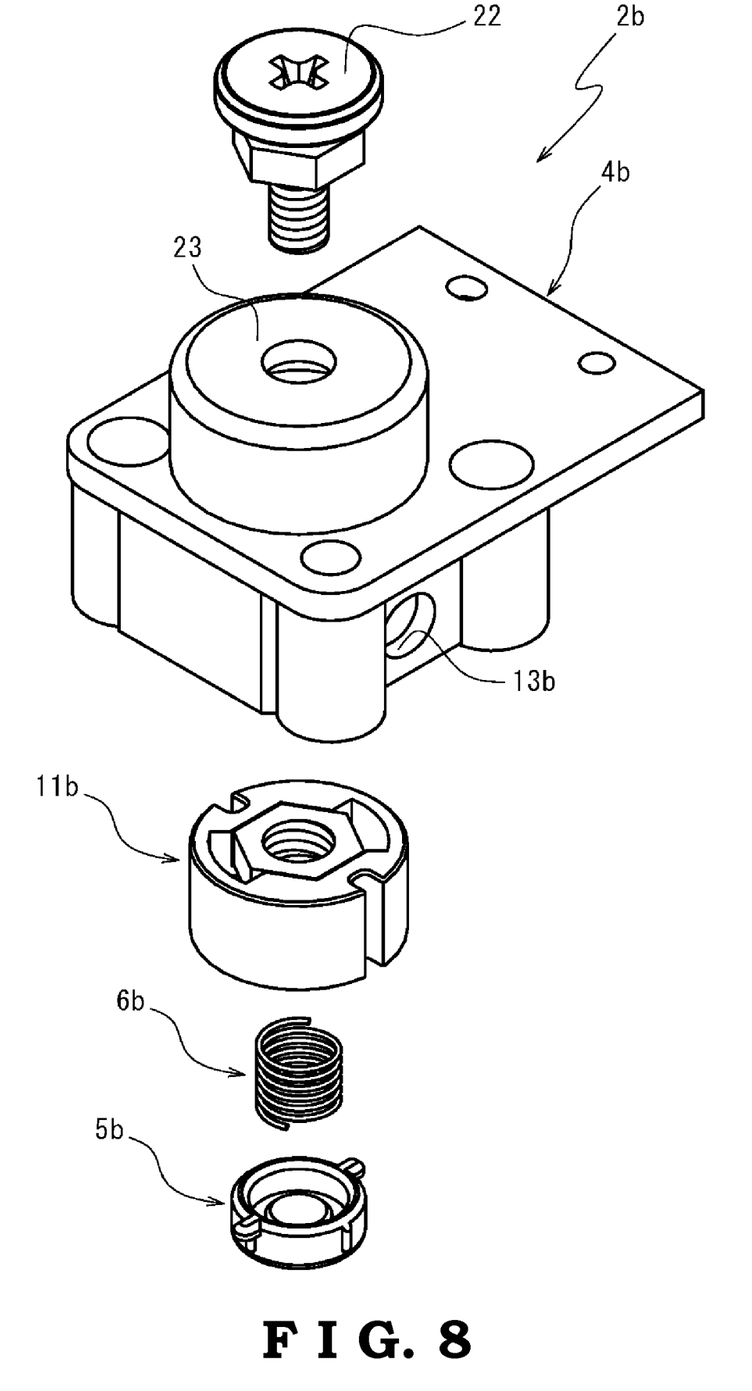
FIG. 8 is an exploded perspective view of a part of a slider of the fader device illustrated in FIG. 6.

As further illustrated in FIG. 8, the slider 2b includes: a main body 4b slidably engaging with the guide rail 1b; a pressure-contact member 5b to be in pressure contact with the friction target member 8b; a compression coil spring 6b for jutting the pressure-contact member 5b toward the friction target member 8b; a holding member 11b that holds the pressure-contact member 5b and the compression coil spring 6b; and an adjustment screw 22 that is attached to the main body 4b and fixes a position of the holding member 11b in a stretch direction of the compression coil spring 6b.

Main Body

The main body 4b of the slider 2b includes: an engaging portion 7b that engages with the guide rail 1b; an operation lever portion 12b that projects to the outside of the housing 3b and to which a knob (not illustrated) is attached; a friction-contact portion 13b that is in contact with the friction target member 8b on an opposite side of the pressure-contact member 5b being in pressure contact; and a receiving portion 23 that receives the holding member 11b in a movable manner in the stretch direction of the compression coil spring 6b, to which the adjustment screw 22 is rotatably attached.

The engaging portion 7b may be configured to have a cylindrical bushing that slidably engages with the guide rail 1b.

The operation lever portion 12b is preferably formed integrally with a portion of the main body 4b retaining the engaging portion 7b, so as to project from the portion retaining the engaging portion 7b to an opposite side of the friction target member 8b, whereby a user's operation can be linearly converted to a travel distance of the slider 2b.

The friction-contact portion 13b is in slidable contact with the friction target member 8b, on an opposite side of the pressure-contact member 5b being in pressure contact. Due to the friction target member 8b being interposed between the friction-contact portion 13b and the pressure-contact member 5b, the posture of the slider 2b around the guide rail 1b is fixed.

The receiving portion 23 may be configured to have: a hole for receiving the holding member 11b; and a lid portion that closes an end of the hole on the opposite side of the friction target member 8b, with a through hole 15b provided on the center through which the adjustment screw 22 is inserted.

The receiving portion 23 preferably has a guide structure that guides the holding member 11b in the stretch direction of the compression coil spring 6b. As the guide structure, for example, rib-like projections that engage with grooves formed on an outer periphery of the holding member 11b, grooves that engage with ribs formed on an outer periphery of the holding member 11b, or the like may be employed.

Holding Member

The holding member 11b has an internal thread into which the adjustment screw 22 is screwed. The internal thread can be provided by attaching a nut as in the present embodiment. When the holding member 11b has the internal thread into which the adjustment screw 22 is screwed, the position of the holding member 11b can be adjusted in a stepless manner by turning the adjustment screw 22.

Adjustment Screw

As illustrated in FIG. 7, the adjustment screw 22 is attached through the through hole 15b on the lid portion of the receiving portion 23, such that a head to be turned by a driver, a hex wrench, etc. is exposed to the outside of the receiving portion 23 of the main body 4b. In addition, the adjustment screw 22 has an anti-drop structure that is in contact with an inner face of the lid portion of the receiving portion 23 to prevent the adjustment screw 22 from dropping from the main body 4b. As the anti-drop structure, for example, a locknut, a pin, a snap ring, and the like may be employed.

Advantages

The fader device of the present embodiment enables easy adjustment of the frictional resistance generated during movement of the slider 2b, through adjustment of a force with which the pressure-contact member 5b is pressed against the friction target member 8b (normal reaction), by turning of the adjustment screw 22.

Other Embodiments

The embodiments described above do not restrict the constituent features of the present invention. Therefore, any omission, substitution and addition of each of the constituent features of the embodiments can be made on the basis of the description of the present specification and common general technical knowledge, and such omitted, substituted and/or added features are to be construed to entirely fall under the scope of the present invention.

The fader device may not have the detection mechanism. As a specific example, in a configuration in which characteristic values such as electric resistance and capacitance, for example, between the guide rail and the friction target member are changed in accordance with the position of the slider, the fader device may be connected to an external circuit and used as a detection element.

In the fader device, in a case in which the guide rail alone is capable of fixing the posture of the slider, the friction-contact portion of the slider is not necessary, and the friction target member is only required to provide a face that extends linearly on which the pressure-contact member can slide, and may be, for example, a wall of the main body of the slider, ribs, etc.

INDUSTRIAL APPLICABILITY

The fader device of the present invention may be particularly suitably used for audio mixers such as a PA mixer and a DJ mixer.

EXPLANATION OF THE REFERENCE SYMBOLS 1, 1a, 1b Guide Rail
2, 2a, 2b Slider
3, 3a, 3b Housing
4, 4a, 4b Main body
5, 5a, 5b Pressure-contact member
6, 6a, 6b Compression coil spring
7, 7a, 7b Engaging portion
8, 8b Friction target member
9, 9b Detection mechanism
10 Driving mechanism
11, 11b Holding member
12, 12b Operation lever portion
13, 13b Friction-contact portion
14 Positioning portion
15, 15b Through hole
16 Positioning groove
17 Positioning projection
18 Engaging projection
19 Engaging groove
20 Mover
21 Detection circuit substrate
22 Adjustment screw
23 Receiving portion

What is claimed is:

1. A fader device comprising
a guide rail that extends linearly; and
a slider that slidably engages with the guide rail and comprising:
a pressure-contact member that is to be in pressure contact with the guide rail; and
a compression coil spring for jutting the pressure-contact member toward the guide rail.

2. A fader device comprising
a guide rail that extends linearly;
a friction target member extending in parallel to the guide rail;
a slider that slidably engages with the guide rail and comprising:
a pressure-contact member that is to be in pressure contact with the friction target member; and
a compression coil spring for jutting the pressure-contact member toward the friction target member.

3. The fader device according to claim 2, wherein the slider further comprises:
a holding member that holds the pressure-contact member and the compression coil spring; and a plurality of positioning portions retaining the holding member respectively at different positions along a biasing direction of the compression coil spring.

4. The fader device according to claim 3, wherein:

each of the plurality of positioning portions comprises a set of grooves provided around a central axis of the compression coil spring;

depths of different sets of grooves respectively constituting different positioning portions are different from one set to another; and the holding member includes a plurality of projections that protrude radially outwardly and engage with one of the sets of grooves.

5. The fader device according to claim 4, wherein the slider comprises a through hole that enables the holding member to be pushed from an opposite side of the friction target member toward the friction target member.

6. The fader device according to claim 3, wherein the slider comprises a through hole that enables the holding member to be pushed from an opposite side of the friction target member toward the friction target member.

7. The fader device according to claim 2, wherein the slider further comprises:

a holding member that holds the pressure-contact member and the compression coil spring; and an adjustment screw that fixes a position of the holding member along a bias direction of the compression coil spring.

* * * * *